United States Patent [19]

Lagana'

[11] 4,317,787
[45] Mar. 2, 1982

[54] DEVICE FOR DISTRIBUTING A LIQUID IN THIN-FILM FORM IN VERTICAL HEAT-EXCHANGERS

[75] Inventor: Vincenzo Lagana', Milan, Italy

[73] Assignee: Snamprogetti S.p.A., Milan, Italy

[21] Appl. No.: 215,171

[22] Filed: Dec. 11, 1980

[30] Foreign Application Priority Data

May 16, 1980 [IT] Italy ............................ 22118 A/80

[51] Int. Cl.³ ............................................. B01F 3/04
[52] U.S. Cl. .................................... 261/112; 138/38;
   165/60; 165/118; 239/468; 261/97; 261/110;
   261/153; 422/198; 422/205
[58] Field of Search ............... 422/148, 198, 200, 205,
   422/312; 261/97, 110, 112, 153; 141/392;
   239/468, 487, 492; 138/38; 165/118, 60

[56] References Cited

U.S. PATENT DOCUMENTS

| | | | |
|---|---|---|---|
| 2,344,560 | 3/1944 | Palkin et al. | 261/112 |
| 2,545,028 | 3/1951 | Haldeman | 261/112 X |
| 2,859,021 | 11/1958 | Raub et al. | 261/112 |
| 3,016,067 | 1/1962 | Edmonds | 165/118 X |
| 3,351,328 | 11/1967 | Vetterli | 261/112 |
| 3,385,575 | 5/1968 | Hall | 261/112 |
| 3,482,947 | 12/1969 | Jacobsen et al. | 261/112 X |
| 3,782,703 | 1/1974 | Kolar | 261/112 |
| 4,248,296 | 2/1981 | Jezek | 165/118 |

FOREIGN PATENT DOCUMENTS 2347093 11/1977 France ............................ 261/112

Primary Examiner—Richard L. Chiesa
Attorney, Agent, or Firm—Morgan, Finnegan, Pine, Foley & Lee

[57] ABSTRACT

An improved device for the distribution of liquids in a vertical heat-exchange apparatus which has reeds mounted on the top ends of vertical tubes to spread a liquid in film form over the internal surface of each tube of the tube bundle. The reeds of the invention are closed at their tops instead of being open as was common in conventional practice, and the reeds have an array of circumferential perforations near their closed tops for venting off gases and vapors which evolve from said liquid, while tangential perforations extend through the peripheral surface of the reeds in intermediate sections thereof. The pressure drop of gases and vapors can be adjusted within a wide range and corrosion in the top portion of the tubes is very efficiently prevented.

7 Claims, 3 Drawing Figures

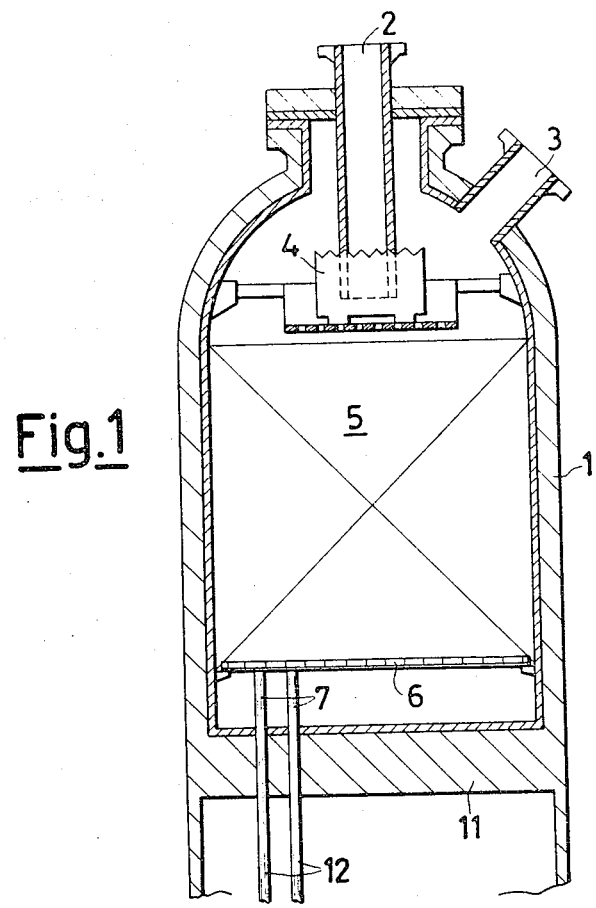
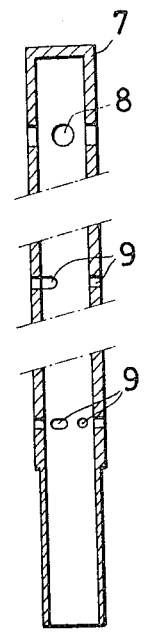
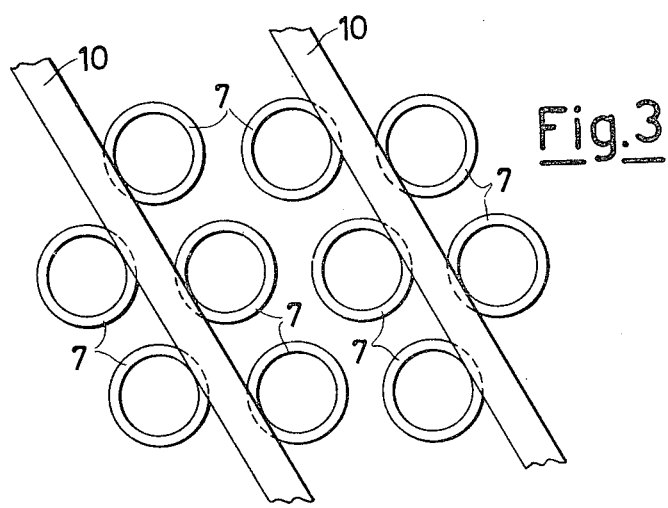

DEVICE FOR DISTRIBUTING A LIQUID IN THIN-FILM FORM IN VERTICAL HEAT-EXCHANGERS

This invention relates to a device for distributing a liquid in thin-film form in vertical heat exchangers. More particularly, this invention is concerned with a device for distributing in film form the urea solution exiting the urea synthesizing reactor of a high-pressure decomposer for ammonium carbamate. Even though the invention is not so limited, reference will be had thereto inasmuch as this is one of the most important applications in the chemical industry.

It is known in a liquid film type heat exchanger to feed the tubes via "reeds", and to feed such tubes at an even rate of flow of liquid.

To achieve this result, the prior art has tendered solutions which can be grouped, in practice, into two basic types of feeders, viz.:

(a) Feeding the liquid at the center of the tube plate and thus the motion of the fluid is centrifugal (from the center towards the periphery), and (b) Feeding the liquid at the periphery of the tube plate and thus the motion of the fluid is centripetal (from the periphery towards the center).

Both these approaches are conductive to an uneven distribution of the liquid. The pressure drop between adjacent distribution reeds produces an elevation head which is at its maximum near the feeding point but which decreases, considerably, as one moves away from such point. The result is an uneven and objectionable distribution of the liquid over the tubes.

Observations made on the conditions of the tubes in the conventional apparatus have shown that a considerable thinning of the tube wall thickness is experienced where the elevation head is higher relative to the point at which the feed rate of flow is high, probably due to the fact that the tubes in that area work under overflooding conditions, thus originating the phenomenon of erosion in the top region of the tubes. In addition to the overflooding phenomenon, it is surmised that in the top region of the tubes a concentrated evolution of gases is experienced, which is due both to the setting free of the inert gases contained in the solution and to the evaporation of a fraction of the free ammonia contained in the solution.

These two factors combine to give rise to corrosion.

The prior art has used "reeds" for distribution of the liquid. The reeds have bores in their tops to allow the evolution of gases and vapors removed from the solution falling in film form along the tubes of the tube bundle; the distribution in film form over the inner walls of such tubes being carried out by having the solution flowing through bores formed through the peripheral surface of the reeds. These bores preferably are tangentially oriented relative to the interior surface of the reeds. As regards the distribution of the liquid over the tube plate, the form of the reeds and the bores is exemplified, typically enough, by the French Patent Specn. No. 2,347,093 assigned to the same Assignee hereof.

It has now been found, quite surprisingly, that the conditions favorable to the corrosion of the exchanger tubes are obtained by the coaction of the non-constant elevation head of the liquid with the fact that the reeds are open at their tops.

The principal object of the present invention is thus to provide a device for the distribution of the liquid in film-form in heat-exchangers, said device essentially comprising, in combination:

(1) A plurality of reeds closed at their tops but equipped on their lateral or peripheral surface and in the vicinity of their sealed tops with bores; tangential perforations being additionally provided on the lateral or peripheral surface of the reeds relative to the intermediate section thereof for the introduction of the liquid into the tube bundle, and (2) A packed bed resting on a wire mesh, preferably one having square meshes, said wire mesh being placed on a grid formed by parallel bars, each of which rests on the edges of two adjoining reed rows. The packing function also can be fulfilled by one or more foraminous plates with holes having a diameter of from 5 mm to 10 mm. In this case, the wire mesh is removed but the grid is left.

As regards the perforations formed through the peripheral surface of the reeds in the top section thereof, they fulfil the task of effecting a pressure drop for the gases and vapors coming from the tubes of the film exchanger. In this connection, it is surprising that a hindrance should be provided inhibiting the evolution of gases and vapors because it is an established rule in distillation operations to minimize the contact time between the gaseous or vapor phase and the liquid phase.

The number of such perforations is generally comprised of between 2 and 8. They have their axes preferably perpendicular to the axis of the reed and are evenly angularly spaced apart circumferentially along the outer periphery of each reed. The pressure drop they are designed to effect lies in the range of 0.1 mm of water to 2,000 mm of water.

With respect to the packing bed, it is composed by conventional packing elements as used in the packing towers: the height of the bed generally is from 500 mm to 2,000 mm; 1,000 mm being the preferred value.

It should be observed that the bars of the grid also could, as an alternative, not be placed resting on the reed edges, but, rather, be so spaced apart from the reeds as to permit a complete passivation of the metallic component parts while concurrently preventing the reeds from being ejected if abrupt pressure changes are experienced. In such a case, the bars rest against the casing wall and their ends lie on appropriate brackets.

The device according to the invention will now be illustrated in the accompanying drawings by way of an illustrative embodiment without limitation.

In the drawings,

FIG. 1 shows the top portion (header) of the film heat-exchanger. The reference numeral 1 indicates the header casing, 2 is the tube for feeding the liquid to be distributed in film-form, 3 is the venting tube for gases and vapors, 4 is a quite conventional distributor for liquids, 5 is the packing bed filled with Raschig rings or like items, and 6 is the grid on which the wire mesh for supporting the packing bed rests. The numeral 7 is applied to two closed "reeds" according to the invention, whereas 11 is the top tube plate of the tube bundle 12: only two tubes of the bundle have been shown in the drawing.

FIG. 2 is a longitudinal sectional view of a single "reed" 7 of the invention. In the drawing, the numeral 8 indicates one of the holes for venting off gases and vapors, and 9 indicates the tangential perforations intended for introducing the liquid into the tubes of the tube bundle.

FIG. 3 is an illustration of the way in which the bars 10 for supporting the wire mesh rest upon two adjoining rows of "reeds" 7.

In its entirety, the vertical heat-exchanging apparatus with liquid film distribution according to the invention is comprised of an outer shell or casing 1 having an opening 2 for introducing the liquid to be processed, an opening for discharging the processed liquid (not shown), an opening 3 for venting off the gases and vapors which have evolved from the liquid, or which have possibly been purposely introduced for stripping the liquid. In the interior, as viewed from top to bottom, the distributor spreads the liquid over the entire internal cross-sectional area of the apparatus and supporting means for such distributor 4, and the liquid spreads and percolates through the packing bed 5 which rests on and is supported by the mesh and grid 6. The top-sealed "reeds" 7 which are hollow in their interiors distribute the liquid in film form to an underlying tube bundle of tubes 12 which rest on said mesh and grid. The top tube plate 11 is secured to the wall 1 and the top sections of the tubes 12 of the tube bundle are inserted therethrough with the reeds 7 being in said top sections. A conventional bottom tube plate (not shown) is secured to the casing wall 1 and the bottom end sections of the tubes 12 of said bundle are inserted thereinto. A heating medium is fed into the space confined by the casing and said top and bottom tube plates in a conventional manner through an opening which has specially been formed through the outer casing in correspondence with said tube bundle, and is discharged through an opening formed in the same region (not shown).

I claim:

1. In a device for distributing a liquid in the form of a thin film in vertical heat-exchanging apparatus comprising an outer casing having an opening for feeding the liquid to be processed, an opening for discharging the processed liquid, an opening for venting off gases and vapors, a liquid distributor for spreading said liquid over the internal cross-sectional area of said casing and means for supporting said distributor, a packing bed through which the distributed liquid percolates, internally hollow reeds for distributing the percolated liquid in the film form into tubes of an underlying tube bundle, each of said reeds having tangential bores extending through the intermediate section of its peripheral surface, a top tube plate secured to the casing wall and in which there are inserted the top end sections of the tubes of said bundle with the reeds inserted into the top portion of the tubes of said tube bundle, the improvement including having said liquid-distributing reeds sealed at their tops with perforations through their peripheral surfaces in the vicinity of the sealed tops for discharging gases and vapors, a grid of parallel bars each of which rests on the edges of any two adjoining reed rows, and a mesh on and supported by said grid which sustains said packing bed.

2. The device according to claim 1, wherein the packing bed has a height of from 500 mm to 2,000 mm, and preferably of 1,000 mm.

3. The device according to claim 1, wherein there are from 2 to 8 bores in each reed for discharging gases and vapors.

4. The device according to claim 1, wherein the reed bores for discharging gases and vapors give rise to a pressure drop of from 0.1 mm of water column to 2,000 mm of water column.

5. The device according to claim 1, wherein the reed bores for discharging gases and vapors have their axes perpendicular to the reed axis.

6. In a device for distributing a liquid in the form of a thin film in vertical heat-exchanging apparatus comprising an outer casing having an opening for feeding the liquid to be processed, an opening for discharging the processed liquid, an opening for venting off gases and vapors, a liquid distributor for spreading said liquid over the internal cross-sectional area of said casing and means for supporting said distributor, a packing bed through which the distributed liquid percolates, internally hollow reeds for distributing the percolated liquid in film form into tubes of an underlying tube bundle, each of said reeds having tangential bores extending through the intermediate section of its peripheral surface, a top tube plate secured to the casing wall and in which there are inserted the top end sections of the tubes of said bundle with the reeds inserted into the top portions of the tubes of said tube bundle, the improvement including: having said liquid-distributing reeds sealed at their tops with perforations through their peripheral surfaces in the vicinity of the sealed tops for discharging gases and vapors, a grid of parallel bars at the top of the tubes supported at their ends by the casing wall, and a mesh on and supported by said grid which sustains said packing bed.

7. In a device for distributing a liquid in the form of a thin film in vertical heat-exchanging apparatus comprising an outer casing having an opening for feeding the liquid to be processed, an opening for discharging the processed liquid, an opening for venting off gases and vapors, a liquid distributor for spreading said liquid over the internal cross-sectional area of said casing and means for supporting said distributor, internally hollow reeds below the distributor for distributing the liquid in film form into tubes of an underlying tube bundle, each of said reeds having tangential bores extending through the intermediate section of its peripheral surface, a top tube plate secured to the casing wall and in which there are inserted the top end sections of the tubes of said bundle with the reeds inserted into the top portions of the tubes of said tube bundle, the improvement including: a foraminous plate having perforations of a diameter of from 5 mm to 10 mm below said distributor and above said reeds and through which the distributed liquid percolates, and wherein said reeds are sealed at their tops and have perforations through their peripheral surface in the vicinity of the sealed tops for discharging gases and vapors.

* * * * *